June 18, 1935.　　　B. J. DENNISON　　　2,005,075
LAMINATED GLASS AND PROCESS OF MAKING THE SAME
Filed Aug. 18, 1934
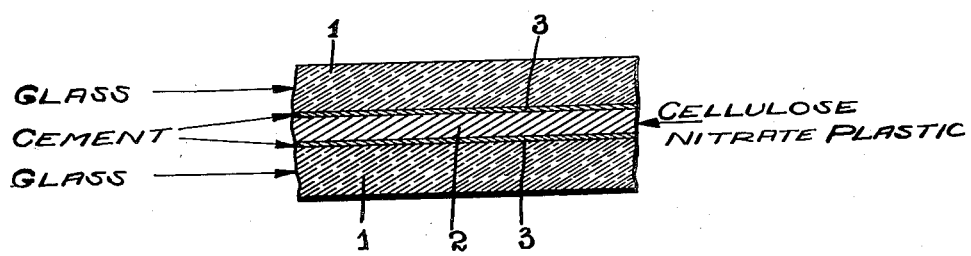
INVENTOR
BROOK J. DENNISON
BY Bradley + Bee
ATTORNEYS Patented June 18, 1935

2,005,075

UNITED STATES PATENT OFFICE 2,005,075

LAMINATED GLASS AND PROCESS OF MAKING THE SAME

Brook J. Dennison, Tarentum, Pa., assignor to Duplate Corporation, Allegheny County, Pa., a corporation of Delaware Application August 18, 1934, Serial No. 740,450

11 Claims. (Cl. 49—81)

The invention relates to laminated glass which ordinarily consists of two sheets of glass cemented to the opposite sides of a sheet of cellulose plastic and particularly to laminated glass in which the reinforcing sheet is cellulose nitrate. Cellulose nitrate plasticized with camphor can be easily cemented to glass with a cement consisting of gelatin and water, but if plasticizers are used in the plastic which are less hygroscopic than camphor, such as dimethyl, diethyl, dibutyl, diamyl or butyl cellosolve phthalates, gelatin and water will not adhere the plastic to the glass satisfactorily. The addition of a water soluble plasticizer to the gelatin and water under these conditions improves the cement somewhat, but not sufficiently to make it satisfactory and commercial. I have found, however, that the addition of a water soluble silicate, such as sodium silicate, to the cement converts it into an adhesive for glass and cellulose nitrate of the type above described which meets all commercial requirements, giving a bond comparable in all particulars to that secured when gelatin is employed to cement glass to ordinary cellulose nitrate plastic containing camphor as a plasticizer. The new cement may be used with good results in three different forms which are as follows:

(1) Water soluble plasticizer plus a water soluble silicate plus water.

(2) Water soluble plasticizer plus a water soluble silicate plus gelatin plus water.

(3) Water soluble plasticizer plus a water soluble silicate plus a borate compound plus water.

A plate of laminated glass made in accordance with the invention is shown in the accompanying drawings, wherein:

The figure is a sectional view through the plate.

In the drawing, 1, 1 are sheets of glass; 2 is a sheet of cellulose nitrate plastic; and 3, 3 are layers of the new cementing medium.

Examples of the cement formed from water soluble plasticizers, water soluble silicates and water are as follows:

|   |   | cc. |
|---|---|---|
| (a) | Sodium silicate solution | 0.9 |
|  | Diglyceryl ether | 10.0 |
|  | Water | 89.1 |
| (b) | Sodium silicate solution | 0.95 |
|  | Diglyceryl ether | 5.00 |
|  | Water | 94.05 |
| (c) | Sodium silicate | 0.9 |
|  | Mono-acetyl diglyceryl ether | 10.0 |
|  | Water | 89.1 |

As a substitute for the sodium silicate in the above formulas, potassium silicate may be used in the same proportion, and in this connection it will be understood that the proportions of the water soluble silicate and plasticizers may be varied within a considerable range, and that mixtures of the two silicates or of various plasticizers may be used.

Other water soluble plasticizers may also be substituted for diglyceryl ether and mono-acetyl diglyceryl ether, among which are diethylene glycol, formol-mono-ethylin, dimethyl ether or tetra ethylene glycol succinate, methyl ether of tetra ethylene glycol acetate and triacetin.

Examples of the cement formed from water soluble plasticizers, water soluble silicates, gelatin and water are as follows:

| (d) | Sodium silicate solution | 0.5 cc. |
|---|---|---|
|  | Diglyceryl ether | 10.0 cc. |
|  | Gelatin | 1.5 grams |
|  | Water | 88.0 cc. |
| (e) | Sodium silicate solution | 0.5 cc. |
|  | Formol-mono-ethylin | 10.0 cc. |
|  | Gelatin | 1.5 grams |
|  | Water | 88.0 cc. |
| (f) | Sodium silicate solution | 0.5 cc. |
|  | Dimethyl ether of tetra ethylene glycol succinate | 10.0 cc. |
|  | Gelatin | 1.5 grams |
|  | Water | 88.0 cc. |
| (g) | Sodium silicate | 0.5 cc. |
|  | Diethylene glycol | 10.0 cc. |
|  | Gelatin | 1.5 grams |
|  | Water | 88.0 cc. |

In the above formulas, as in the preceding ones, potassium silicate may be substituted for the sodium silicate, and the other water soluble plasticizers heretofore given may be substituted for those given in the preceding formulas (d), (e), (f) and (g).

An example of the cement formed from a water soluble plasticizer, a water soluble silicate, a borate compound and water is:

| (h) | Boric acid | 1.0 gram |
|---|---|---|
|  | Sodium silicate | 0.625 gram |
|  | Diglyceryl ether | 2.5 cc. |
|  | Water | 93.375 cc. |

In the above formula, other borate compounds may be substituted for the boric acid, for example potassium borate, potassium tetraborate, sodium borate and sodium tetraborate. Further potassium silicate may be substituted for the sodium silicate and other of the water soluble plasticizers heretofore enumerated may be substituted for the diglyceryl ether.

In compositing the glass and cellulose nitrate plastic with any of the foregoing cements, the solution is placed on the glass sheets in a thin film, after which the glass sheets are applied to the plastic sheet, and a lamination is secured in the usual way by the application of heat and pressure, preferably by the hydraulic method of the Sherts and Hamill Patent No. 1,181,084, the pressure employed in the final pressing being about 150 pounds per square inch, and the temperature being about 240 degrees F.

What I claim is:

1. A method of compositing a sheet of cellulose nitrate plastic and a glass sheet which consists in coating the face of the glass sheet with a cement comprising a water soluble plasticizer of the plastic, a water soluble silicate and water, assembling the sheets and applying heat and pressure.

2. A method of compositing a sheet of cellulose nitrate plastic and a glass sheet which consists in coating the face of the glass sheet with a cement comprising a water soluble plasticizer of the plastic, sodium silicate and water, assembling the sheets and applying heat and pressure.

3. A method of compositing a sheet of cellulose nitrate plastic and a glass sheet which consists in coating the face of the glass sheet with a cement comprising a water soluble plasticizer of the plastic, a water soluble silicate, gelatin and water, assembling the sheets and applying heat and pressure.

4. A method of compositing a sheet of cellulose nitrate plastic and a glass sheet which consists in coating the face of the glass sheet with a cement comprising a water soluble plasticizer of the plastic, sodium silicate, gelatin and water, assembling the sheets and applying heat and pressure.

5. A method of compositing a sheet of cellulose nitrate plastic and a glass sheet which consists in coating the face of the glass sheet with a cement comprising a water soluble plasticizer of the plastic, a water soluble silicate, a borate compound, and water, assembling the sheets and applying heat and pressure.

6. A method of compositing a sheet of cellulose nitrate plastic and a glass sheet which consists in coating the face of the glass sheet with a cement comprising a water soluble plasticizer of the plastic, a water soluble silicate, a borate compound, sodium silicate, and water, assembling the sheets and applying heat and pressure.

7. A method of compositing a sheet of cellulose nitrate plastic and a glass sheet which consists in coating the face of the glass sheet with a cement comprising a water soluble plasticizer of the plastic, a water soluble silicate, boric acid and water, assembling the sheets and applying heat and pressure.

8. A laminated plate comprising a pair of glass sheets cemented to the opposite sides of a sheet of cellulose nitrate plastic with a cement comprising a water soluble plasticizer of the plastic, a water soluble silicate, and water.

9. A laminated plate comprising a pair of glass sheets cemented to the opposite sides of a sheet of cellulose nitrate plastic with a cement comprising a water soluble plasticizer of the plastic, sodium silicate and water.

10. A laminated plate comprising a pair of glass sheets cemented to the opposite sides of a sheet of cellulose nitrate plastic with a cement comprising a water soluble plasticizer of the plastic, a water soluble silicate, gelatin and water.

11. A laminated plate comprising a pair of glass sheets cemented to the opposite sides of a sheet of cellulose nitrate plastic with a cement comprising a water soluble plasticizer of the plastic, a water soluble silicate, a borate compound and water.

BROOK J. DENNISON.